United States Patent
Mikami et al.

(10) Patent No.: US 7,960,458 B2
(45) Date of Patent: Jun. 14, 2011

(54) FLAME RETARDANT, RESIN COMPOSITION AND RESIN-MOLDED ARTICLE

(75) Inventors: Masato Mikami, Kanagawa (JP);
Masayuki Okoshi, Kanagawa (JP);
Kazuya Yamanoi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 71 days.

(21) Appl. No.: 12/332,909

(22) Filed: Dec. 11, 2008

(65) Prior Publication Data
US 2009/0264564 A1   Oct. 22, 2009

(30) Foreign Application Priority Data

Apr. 22, 2008  (JP) ................................ 2008-111738

(51) Int. Cl.
*C08K 5/41* (2006.01)
*C08G 75/20* (2006.01)
(52) U.S. Cl. ...................................... 524/156; 525/535
(58) Field of Classification Search .................. 524/156, 524/157, 159; 525/535
See application file for complete search history.

(56) References Cited

U.S. PATENT DOCUMENTS

| 4,263,203 | A | * | 4/1981 | Hata et al. ...................... 524/100 |
| 5,422,423 | A | * | 6/1995 | Shacklette et al. ............ 528/422 |
| 6,255,450 | B1 | * | 7/2001 | Angelopoulos et al. ...... 528/422 |
| 7,056,458 | B2 | * | 6/2006 | Crost et al. ...................... 264/48 |

FOREIGN PATENT DOCUMENTS

| JP | A-10-60447 | 3/1998 |
| JP | A-2006-001839 | 1/2006 |
| JP | A-2007-106803 | 4/2007 |
| JP | A-2007-119645 | 5/2007 |

OTHER PUBLICATIONS

Machine translation of JP 2007-119645. May 2007.*
Derwent-Acc-No. 1982-05538J. 1982.*

* cited by examiner

*Primary Examiner* — Milton I Cano
*Assistant Examiner* — John Uselding
(74) *Attorney, Agent, or Firm* — Oliff & Berridge, PLC

(57) ABSTRACT

A flame retardant includes an ion complex formed from compounds including at least one first compound each selected from sulfuric acid or a compound having a sulfonic acid group and a second organic compound each having a cationic moiety. The ionic complex includes ionic bonding of sulfuric acid or a sulfonic acid group in the at least one first compound and at least one cationic moiety in the at least one second organic compound. At least one of the at least one first compound or the at least one second organic compound includes a high-molecular-weight compound.

12 Claims, 1 Drawing Sheet

FLAME RETARDANT, RESIN COMPOSITION AND RESIN-MOLDED ARTICLE

CROSS-REFERENCE TO RELATED APPLICATION

This application is based on and claims priority under 35 USC 119 from Japanese patent Application No. 2008-111738 filed on Apr. 22, 2008.

BACKGROUND

1. Technical Field

The present invention relates to a flame retardant, a resin composition and a resin-molded article.

2. Related Art

Halogen compounds, antimony trioxide, phosphorus compounds, hydrated metal compounds and the like have been used as flame retardants to be mixed with matrix resins (hereinafter, referred to simply as "resin") so as to impart flame-retarding property thereto. However, use of the halogen compounds and antimony trioxide is declining because of environmental concern. The phosphorus compounds may cause foams during molding although their flame retardancy is excellent. The hydrated metal compounds deteriorate physical properties of the polymer since the hydrated metal compounds require larger blending amount in order to obtain flame retardancy equivalent to that of other organic flame-retardant compounds. Therefore, development of non-halogen-based flame retardants with higher flame-retarding effectiveness is expected.

SUMMARY

According to an aspect of the invention, there is provided a flame retardant including an ion complex formed from compounds including (i) at least one first compound each selected from sulfuric acid or an organic compound having a sulfonic acid group and (ii) at least one second organic compound each having a cationic moiety, the ion complex including ionic bonding of sulfuric acid or a sulfonic acid group in the at least one first compound and at least one cationic moiety in the at least one second organic compound, and at least one of the at least one first compound or the at least one second organic compound including a high-molecular-weight compound.

DETAILED DESCRIPTION

Figure 1:
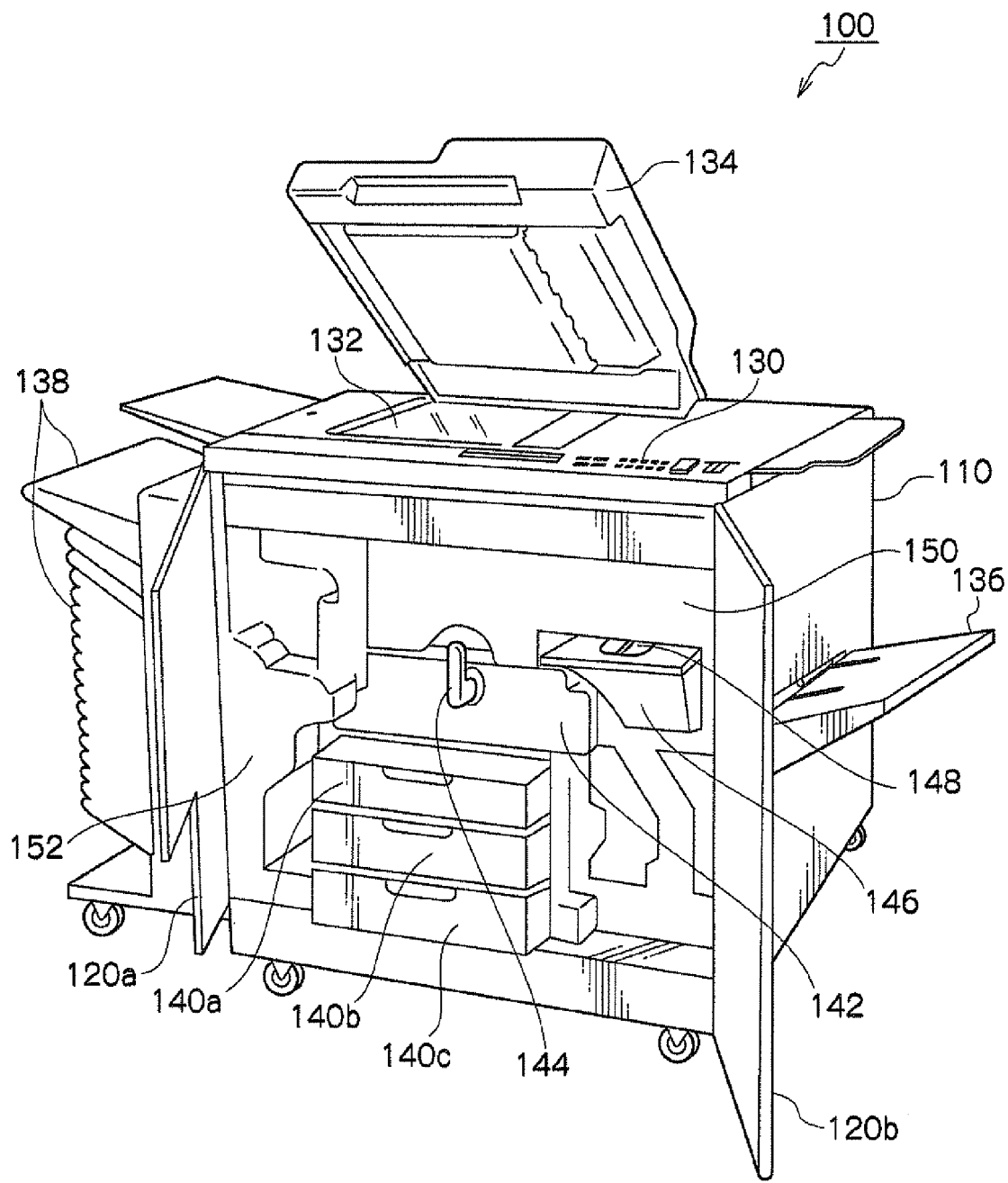
FIG. 1 is a schematic view showing an example of an image forming apparatus provided with a frame and office equipment parts that are formed using resin-molded articles according to an exemplary embodiment.

Hereinafter, an exemplary embodiment according to the present invention will be described in detail.

—Flame Retardant—

A flame retardant of an exemplary embodiment includes an ion complex formed from compounds including (i) one first compound that is sulfuric acid or an organic compound having a sulfonic acid group or plural first compounds each selected from sulfuric acid or an organic compound having a sulfonic acid group and (ii) one second organic compound having a cationic moiety or plural second organic compounds having cationic moieties that may be the same as each other or different from each other, and the ion complex includes ionic bonding of sulfuric acid or a sulfonic acid group in the first compound(s) and at least one cationic moiety in the second organic compound(s). At least one selected from the group consisting of "the one first compound or plural first compounds and the one second organic compound or plural second organic compounds", which form the ion complex, includes a high-molecular-weight compound. That is, each first compound is sulfuric acid that ionically binds to a cationic moiety in the second organic compound or has a sulfonic acid group that ionically binds to a cationic moiety in the second organic compound, while each second organic compound has a cationic moiety that ionically binds to sulfuric acid as a first compound or to a sulfonic acid group in a first compound.

The term "flame retardant" used herein refers to a substance that increases the flame retardancy of a resin that is not itself flame retarding (that is, having a flame retardancy lower than HB defined by UL-94) to no lower than HB defined by UL-94 when added to the resin.

The flame retardancy (UL Standard) is a standard concerning the safety of electrical apparatuses specified and approved by Underwriters Laboratories Inc. in U.S., and is a standard determined by the vertical flame test in the UL flammability test methods. The flame retardancy is classified into V-0, V-1, and V-2 classes, and a class closer to V-0 indicates that the material has higher flame retardancy. When dropping of melt does not occur and the combustion time is 10 seconds or less (V-0) to 30 seconds or less (V-1), the flame retardancy is rated as V-0 or V-1 level, and when dropping of melt occurs and the combustion time is 30 seconds or less, the flame retardancy is rated as V-2.

The at least one first compound in the ion complex is not limited as long as each first compound is selected from sulfuric acid or an organic compound having at least a sulfonic acid group that ionically binds to a cationic moiety in a second organic compound when the ion complex is formed, as described above. Examples of the first compound include, specifically, sulfuric acid, a substituted or unsubstituted aromatic hydrocarbon having a sulfonic acid group, a substituted or unsubstituted aliphatic hydrocarbon having a sulfonic acid group, styrenesulfonic acid, and a polymer or copolymer of acrylamidemethylpropanesulfonic acid. Among them, sulfuric acid, a substituted or unsubstituted aromatic hydrocarbon having a sulfonic acid group, and a polymer or copolymer of acrylamidemethylpropanesulfonic acid are preferably used.

Examples of the unsubstituted aromatic hydrocarbon having a sulfonic acid group described above include benzenesulfonic acid, naphthalenesulfonic acid, pyridinesulfonic acid, and isoquinolinesulfonic acid.

Examples of the substituent on the aromatic hydrocarbon having a sulfonic acid group described above include, though not particularly limited to, an alkyl group having 1 to 10 carbon atoms, a phenyl group, an alkoxyl group, an amino group, an amide group, an aryl group, an acyl group, a vinyl group, an allyl group, a hydroxyl group, an ester group, a carboxyl group, a nitro group, an acetyl group, and a mercapto group. Among them, an amino group, a hydroxyl group, and a mercapto group are preferably used because of ease of complex formation (formation of the ion complex). In this regard, numbers and positions of the substituents are not particularly limited.

Examples of the unsubstituted aliphatic hydrocarbon having a sulfonic acid group described above include ethanesulfonic acid, 1-butanesulfonic acid, 1-propanesulfonic acid, 1-pentanesulfonic acid, 1-hexanesulfonic acid, 1-heptanesulfonic acid, 1-octanesulfonic acid, 1-nonanesulfonic acid, 1-decanesulfonic acid, and 1-undecanesulfonic acid.

Examples of the substituent on the aliphatic hydrocarbon having a sulfonic acid group described above include, though not particularly limited to, an amino group, a hydroxyl group, and a mercapto group. In this regard, numbers and positions of the above substituents are not particularly limited.

The at least one first compound in the ion complex may have an aromatic ring. When the at least one first compound in the ion complex includes an organic compound having an aromatic ring, water resistance and hydrolysis resistance may be improved. Accordingly, bleed (oozing out) of the flame retardant containing the above ion complex from resin may be supposed to be suppressed.

Examples of the first compound having an aromatic ring include, specifically, benzenesulfonic acid, toluenesulfonic acid, naphthalenesulfonic acid, styrenesulfonic acid, phenolsulfonic acid, and aminobenzenesulfonic acid. Among them, aminobenzenesulfonic acid is particularly preferable because of ease of complex formation (formation of the ion complex), flame-retarding effectiveness, and water resistance.

As described above, the at least one first compound in the ion complex is sulfuric acid that ionically binds to a cationic moiety in a second organic compound or has a sulfonic acid group that ionically binds to a cationic moiety in a second organic compound, and the first (organic) compound may further have a cationic moiety that ionically binds to sulfuric acid as another first compound or to a sulfonic acid group in another first (organic) compound molecule in the ion complex. Examples of such a first (organic) compound include, specifically, aminobenzenesulfonic acid, phenylenediaminesulfonic acid, toluidinesulfonic acid, and aminonaphthalenesulfonic acid.

The at least one second organic compound to form the ion complex is not limited as long as the second organic compound has at least a cationic moiety that ionically binds to sulfuric acid as a first compound or to a sulfonic acid group in a first (organic) compound when the ion complex is formed, as described above.

The cationic moiety may have a structure containing a nitrogen atom. It is considered that the use of the cationic moiety containing a nitrogen atom may improve compatibility with resins, which may lead to improvement of mechanical strength of the resin compositions and the resin-molded articles.

The second organic compound containing a nitrogen atom as a cationic moiety may contain a nitrogen atom in the main skeleton and/or may have a substituent containing a nitrogen atom. When the cationic moiety is a substituent containing a nitrogen atom, examples of the substituent (cationic group) include primary to tertiary amino groups and a quaternary ammonium base.

Examples of the second organic compound having an amino group as a cationic moiety include, specifically, a polyalkyleneimine such as polyethyleneimine or polypropyleneimine; an aliphatic polyamine such as methylenediamine, ethylenediamine, propylenediamine, 1,2-diaminopropane, 1,3-diaminopentane, hexamethylenediamine, diaminoheptane, diaminododecane, diethylenetriamine, diethylaminopropylamine, N-aminoethylpiperazine, or triethylenetetramine; an alicyclic amine such as diaminocyclohexane or bis(4-aminocyclohexyl)methane; and an aromatic polyamine such as diaminotoluene, diaminoxylene, tetramethylxylylenediamine, methaphenylenediamine, diaminodiphenylmethane, or diaminodiphenylsulfone. Among them, polyalkyleneimines are preferable, and polyethyleneimine is particularly preferable for use, in the light of enhancement in mechanical strength of the resin compositions and the resin-molded articles.

At least one of the at least one first (organic) compound or the at least one second organic compound in the ion complex described above may include a compound having a branch. By having a branch, cross-linking may be facilitated between first compound molecules, between second organic compound molecules, or between a first compound molecule and a second organic compound molecule, whereby mechanical strength of the resin compositions and the resin-molded articles may be supposed to be enhanced.

In the first (organic) compound having a branch, specifically, the branching may occur at a carbon site, and such a first organic compound may have a substituent. The branching may be accomplished by binding through an active group such as an epoxy group, an isocyanate group, or an acid chloride. Among them, a first (organic) compound having a substituent is suitable for use.

On the other hand, in the second organic compound having a branch, specifically, branching may occur at a nitrogen site. Such a second organic compound may have a tertiary amino group, and polyethyleneimine is suitable for use.

The above ion complex may have a cross-linked structure from both aspects of bleed suppression and improvement in mechanical strength of the resin compositions and the resin-molded articles. Examples of the first (organic) compound having a cross-linked structure include a cross-linked polymer obtained by a cross-linking reaction of a monomer having a sulfonic acid group such as styrenesulfonic acid or acrylamidemethylpropanesulfonic acid, with a monomer having two or more vinyl groups such as N,N'-methylenebisacrylamide or divinylbenzene. Examples of the second organic compound having a cross-linked structure include a cross-linked polymer obtained by a cross-linking reaction of polyethyleneimine, polypropyleneimine, polyallylamine or the like, with a substance having a polyfunctional epoxy group or a polyfunctional isocyanate group.

Further, the cross-linked structure of the ion complex may include cross-linking by ionic bonding of the sulfonic acid group or sulfuric acid and the cationic moiety, which acts as a cross-linking point. The cross-linking by ionic bonding may be conducted by, for example, adding the second organic compound to the first compound so as to combine them electrostatically.

Furthermore, a sulfonic acid group or sulfuric acid in the first compound and a cationic moiety in the second organic compound may form a salt. When the salt is formed, the ion complex formed from the first compound and the second organic compound is neutral. Accordingly, mold contamination during the formation (molding) of the resin-molded articles including the flame retardant containing the ion complex is supposed to be suppressed.

Determination on whether or not the ion complex is neutral may be conducted as follows. The formed ion complex is added into water at normal temperature (25° C.). When the difference between the pH value of the water before adding the ion complex and the pH value of the water after adding the ion complex is within the range of −1 to +1, the ion complex is considered to be neutral.

Although compounds having polar groups such as a sulfonic acid group or an amino group are generically hydrophilic, the ion complex contained in the flame retardant according to the exemplary embodiment is insoluble in water. This is because at least one of the at least one first compound or the at least one second organic compound includes a high-molecular-weight compound, and sulfuric acid or sulfonic acid group(s) and cationic moiety (or cationic moieties) are associated with each other through ionic bonding.

The term "insoluble in water" used in the exemplary embodiment refers to the following property: A substance is considered to be insoluble in water if, after a 1 wt % water-dispersion liquid (20° C.) of the substance is prepared and stirred for 1 hour, the liquid is cloudy, separated into two layers, or having precipitates dispersed therein when observed with naked eyes.

As described above, at least one selected from the at least one first compound or the at least one second organic compound in the ion complex contained in the flame retardant of the exemplary embodiment includes a high-molecular-weight compound. The weight-average molecular weight of the high-molecular-weight compound is preferably in the range of 1000 to 1,000,000 Mw, more preferably in the range of 5000 to 500,000 Mw, and still more preferably in the range of 10,000 to 100,000 Mw.

Also, in the ion complex contained in the flame retardant of the exemplary embodiment, the sulfuric acid or sulfonic acid group(s) in the first compound(s) and cationic moiety (or cationic moieties) in the second organic compound(s) may be bonded tonically at an appropriate proportion, in view of water resistance, dispersibility, bleed (oozing out), mold contamination and the like. Specifically it is preferable that all of the sulfuric acid and sulfonic acid group(s) be bonded ionically to cationic moiety (or cationic moieties).

The at least one first compound in the ion complex contained in the flame retardant according to the exemplary embodiment may be one or plural compounds selected from the above. The at least one second organic compound in the ion complex contained in the flame retardant according to the exemplary embodiment may be one or plural compounds selected from the above.

Although the ion complex is not limited as long as it includes ionic bonding of sulfuric acid or a sulfonic acid group in the first compound(s) and at least one cationic moiety in the second organic compound(s) as described above, the ion complex may include two or more ionic bonds between at least one first compound and at least one second organic compound. In the above configuration, since the ion complex includes the same type of bonding—ionic bonding—, the decomposition temperature may be easily controlled and the concentration of the sites that contribute to an improvement in flame retardancy may be increased. Accordingly, flame retardancy of the resin compositions and resin-molded articles are supposed to be further improved.

The ion complex including two or more ionic bonds between first compound(s) and second organic compound(s) may have, for example, any of the following structures: (i) the ion complex has two or more direct ionic bonds between the first compound(s) and the second organic compound(s) (for example, two or more second organic compound molecules are directly bonded to a first compound molecule, or two or more first compound molecules are directly bonded to a second organic compound molecule); (ii) the ion complex has a first (organic) compound molecule that has a cationic moiety as well as a sulfonic group and that ionically links another first compound molecule and a second organic compound molecule.

The ion complex may include, for example, a second organic compound which is a high-molecular-weight compound and plural low-molecular-weight compounds (specifically a first organic compound having both of a sulfonic acid group and a cationic moiety, another first compound that is sulfuric acid or has a sulfonic acid group, and another second organic compound having a cationic moiety).

In the above structure, the high-molecular-weight second organic compound is not limited as long as it is a high-molecular-weight compound having a cationic moiety that is ionically bonded when the ion complex is formed as described above. The high-molecular weight second organic compound may be, for example, a high-molecular-weight compound having a nitrogen atom in the main skeleton or a high-molecular-weight compound having a substituent containing nitrogen. Examples of the high-molecular-weight second organic compound include, specifically, polyethyleneimine, polypropyleneimine, polyallylamine, and copolymers thereof. Among them, polyethyleneimine, which is a high-molecular-weight compound containing nitrogen in the main skeleton, is more preferable.

The first organic compound having both of a sulfonic acid group and a cationic moiety, as one of the plural low-molecular-weight compounds included in the above ion complex structure may be, for example, a low-molecular-weight compound containing a sulfonic acid group and a nitrogen atom. Examples of the low-molecular-weight compound first organic compound having both of a sulfonic acid group and a cationic moiety include, specifically, aminobenzenesulfonic acid, phenylenediaminesulfonic acid, toluidinesulfonic acid, and aminonaphthalenesulfonic acid. Among them, aminobenzenesulfonic acid is more preferable.

The first compound that is sulfuric acid or has a sulfonic acid group, one of the plural low-molecular-weight compounds included in the above ion complex structure, may be, for example, sulfuric acid, naphthalenedisulfonic acid, anilinedisulfonic acid, ethanedisulfonic acid, or propanedisulfonic acid. Among them, sulfuric acid is more preferable.

The second organic compound having a cationic moiety, one of the plural low-molecular-weight compounds included in the above ion complex structure may be, for example, a compound containing a nitrogen atom. Examples of the above second organic compound include, specifically, amylamine, aminopentane, hexylamine, methylbutylamine, octylamine, aminobenzene, naphthylamine, aminophenol, and dimethylaniline. Among them, octylamine is more preferable.

The ion complex containing a high-molecular-weight compound second organic compound and plural low-molecular-weight compounds (including a first organic compound having both of a sulfonic acid group and a cationic moiety, another first compound that is sulfuric acid or has a sulfonic acid group, and another second organic compound having a cationic moiety) may have a structure in which the cationic moiety in the high-molecular-weight second organic compound is bonded ionically to the sulfonic acid group in the low-molecular-weight first organic compound having both of the sulfonic acid group and a cationic moiety, the cationic moiety in the low-molecular-weight first organic compound is bonded ionically to the another low-molecular-weight first compound that is sulfuric acid or has a sulfonic acid group, and the sulfuric acid or sulfonic acid group is bonded ionically to the low-molecular-weight second organic compound having a cationic moiety.

For example, an ion complex structure may be adopted in which the high-molecular-weight second organic compound having a nitrogen atom in the main skeleton is bonded ionically to the low-molecular-weight compounds including aminobenzenesulfonic acid (a first organic compound), sulfuric acid (another first compound), and octylamine (a second organic compound).

When plural ionic bonds are sequentially formed between at least one of sulfuric acid or a sulfonic acid group and cationic moieties as described above, the ion complex has ionic bonds that are similar to each other Therefore the decomposition temperature may be easily controlled and the sites that contribute to an improvement in flame retardancy may have a high concentration, which is desirable in view of further improvement in flame retardancy of the resin compositions and resin-molded articles.

Another example of the above-described ion complex structure includes a first organic compound that is a high-molecular-weight compound and, as plural low-molecular-weight compounds, a second organic compound having plural cationic moieties and another first compound that is sulfuric acid or has a sulfonic acid group.

In the above structure, the high-molecular-weight first organic compound is not limited as long as it is a high-molecular-weight compound having a sulfonic acid that is ionically bonded when the ion complex is formed as described above; examples of the high-molecular-weight first organic compound include a polymer or copolymer of acrylamidemethylpropanesulfonic acid and a polymer or copolymer of styrenesulfonic acid.

The second organic compound having plural cationic moieties, one of the plural low-molecular-weight compounds included in the above ion complex structure, may be, for example, a low-molecular-weight compound containing plural nitrogen atoms. Examples of the low-molecular-weight second organic compound having plural cationic moieties include, specifically, p-diaminobenzene, triaminobenzene, diethylenetriamine, diaminotoluene, amidol, diaminonaphthalene, diaminohexane, diaminooctane, diaminoheptane, and cyclohexandiaminine. Among them, an aromatic low-molecular-weight compound having plural cationic moieties is particularly preferable.

The first compound that is sulfuric acid or has a sulfonic acid group, one of the plural low-molecular-weight compounds included in the above ion complex structure, may be, for example, sulfuric acid, naphthalenedisulfonic acid, anilinedisulfonic acid, ethanedisulfonic acid, or propanedisulfonic acid. Among them, sulfuric acid is preferable.

The above ion complex formed from a high-molecular-weight first organic compound and, as plural low-molecular-weight compounds, a second organic compound having plural cationic moieties and another first compound that is sulfuric acid or has a sulfonic acid group may have a structure in which a sulfonic acid group in the high-molecular-weight first organic compound is bonded ionically to one cationic moiety in the low-molecular-weight second organic compound having plural cationic moieties and another cationic moiety is bonded ionically to the low-molecular-weight first compound that is sulfuric acid or has a sulfonic acid group.

An example of the ion complex has a structure in which a high-molecular-weight first organic compound having a sulfonic acid group as a substituent is bonded ionically to diaminobenzene (as a second organic compound) and benzenesulfonic acid (as another first organic compound), which are low-molecular-weight compounds.

When plural ionic bonds are sequentially formed between at least one of sulfuric acid or a sulfonic acid group and cationic moieties as described above, the ion complex has ionic bonds that are similar to each other. Therefore the decomposition temperature may be easily controlled and the sites that contribute to an improvement in flame retardancy may have a high concentration, which is desirable in view of further improvement in flame retardancy of the resin compositions and resin-molded articles.

<Resin Composition>

A resin composition of the exemplary embodiment contains the above-described flame retardant and a resin (hereinafter, referred to as "additional resin").

Examples of the "additional resin" include, though not particularly limited to, acrylonitrile-butadiene-styrene copolymers (ABS), methylpentene, thermoplastic vulcanized elastomers, thermoplastic polyurethane, styrene-isoprene-styrene block copolymers, silicone, styrene-ethylene-propylene-styrene block copolymers, styrene-ethylene-butylene-styrene block copolymers, styrene-butadiene-styrene block copolymers, styrene-butadiene rubbers, styrene-butadiene copolymers, acrylonitrile-styrene copolymers, polyvinylpyrrolidone, polyvinyl alcohol, polyvinyl methyl ether, polyvinyl isobutyl ether, polyvinylformal, polyvinylbutyral, polyvinyl acetate, polytrimethylene terephthalate, polysulphone (PSF), polysulfone, polystyrene, polyphenylene sulfide, polyphenylene ether, polypropylene, polyphthalamide, polyoxymethylene, polymethylpentene, polymethyl methacrylate, polymethacrylonitrile, polymethoxyacetal, polyisobutylene, thermoplastic polyimide, polyethylene terephthalate, polyethersulfone, polyethylene naphthalate, polyethernitrile, polyetherimide, polyetheretherketone, polyethylene, polycarbonate, polybutylene terephthalate, polybutadiene-styrene, poly-p-phenylenebenzobisoxazole, poly-n-butyl methacrylate, polybenzimidazole, polybutadiene-acrylonitrile, polybutene-1, polyallylsulfone, polyarylate, polyacrylonitrile, thermoplastic polyester-alkyd resins, thermoplastic polyamide-imide, polyacrylic acid, polyamide, natural rubbers, nitrile rubbers, methyl methacrylate-butadiene-styrene copolymers, polyethylene, isoprene rubbers, ionomers, butyl rubbers, furan resins, ethylene-vinyl alcohol copolymers, ethylene-vinyl acetate copolymers, ethylene-propylene-diene terpolymers, cellulose propionate, hydrin rubbers, carboxymethyl cellulose, cresol resins, cellulose acetate propionate, cellulose acetate butyrate, cellulose acetate, bismaleimide triazine, cis-1,4-polybutadiene synthetic rubbers, acrylonitrile-styrene-acrylate, acrylonitrile-styrene copolymers, acrylonitrile-ethylene-propylene-styrene copolymers, acrylic ester rubbers, and polylactic acid. The additional resin may include one, or a combination of two or more, of these resins.

In the resin composition according to the exemplary embodiment, the content of the flame retardant is preferably in the range of 1 to 80 parts by weight, more preferably in the range of 5 to 50 parts by weight, per 100 parts by weight of the resin composition. When the content of the flame retardant contained in the resin composition is within the above range, sufficient flame retardancy and excellent mechanical strength of the molded articles formed from the resin composition may be achieved.

On the other hand, in the resin composition, the content of the additional resin described above is preferably in the range of 20 to 99 parts by weight, more preferably in the range of 50 to 95 parts by weight, per 100 parts by weight of the resin composition. When the content of the additional resin contained in the resin composition is within the above range, sufficient flame retardancy and excellent mechanical strength of the molded articles formed from the resin composition may be achieved.

The resin composition may further contain, in addition to the above-described flame retardant, a flame retardant (hereinafter referred to as "additional flame retardant") other than the above-described flame retardant. The "additional flame retardant" may be contained in the additional resin at a lower content than that of the above-described flame retardant. Therefore, a resin composition containing only the additional flame retardant is clearly outside the scope of the exemplary embodiment.

Examples of the "additional flame retardant" include phosphorus-containing flame retardants and bromine-containing flame retardants.

In addition, the resin composition according to the exemplary embodiment may further contain, as necessary, additives, such as antioxidants, toughening agents, compatibilizers, weather-resistant agents, and hydrolysis inhibitors, catalysts, and the like. The content of each of the additive and the catalyst may be 5 weight % or less with respect to the amount of total solid of the resin composition.

<Resin-molded Article>

A resin-molded article of the exemplary embodiment is formed by molding the resin composition described above.

The resin-molded article may be obtained by molding the above resin composition in a known method such as injection molding, injection-compression molding, press molding, extrusion molding, blow molding, calendar molding, coat molding, cast molding, or dip molding.

One or more molding machines selected from a press molding machine, an injection molding machine, a mold molding machine, a blow molding machine, an extrusion molding machine, or a fiber-spinning molding machine may be used for obtaining a resin-molded article of the exemplary embodiment. Accordingly, molding may be performed by one of these molding machines, and then the molding may be optionally continued by another molding machine.

The shape of the formed resin-molded article is not particularly limited, and examples include a sheet shape, a rod shape, and a fiber shape. The size of the resin-molded article is not limited, either.

The resin-molded article of the exemplary embodiment may be applied to, for example, frames and/or parts of home electric appliances and office equipments, wrapping films, cases for CD-ROMs and DVDs, tableware, food trays, beverage bottles, and chemical wrapping materials.

The resin-molded article may have a flame retardancy of HB or higher according to the UL-94 test. A resin-molded article with such a property may be obtained by molding the resin composition described above.

FIG. 1 shows an example of an image forming apparatus provided with frames and office equipment parts that are formed using resin-molded articles according to the exemplary embodiment, and is an external perspective view of the image forming apparatus seen from the front side thereof. The image forming apparatus 100 in FIG. 1 is provided with front covers 120a and 120b at the front side of a body device 110. The front covers 120a and 120b can be opened and closed so that operators can access to inside of the apparatus. This allows the operators to replenish toner when toner is exhausted, to replace an exhausted process cartridge, and to remove jammed paper when a paper jam occurs inside the apparatus. The apparatus shown in FIG. 1 is in a state in which the front covers 120a and 120b are open.

The body device 110 is provided with, at the upper side thereof an operation panel 130 with which various conditions concerning image forming such as paper sizes and number of copies are input by operation by the operator and a copy glass 132 on which an original document to be scanned is placed. The body device 110 is provided with, at an upper portion thereof, an automatic document feeder 134 capable of delivering the document onto the copy glass 132 automatically. Further, the body device 110 is provided with an image scanner that obtains image data representing the document image by scanning the original document image placed on the copy glass 132. The image data obtained by the image scanner is sent to an image forming unit through a control unit. In this regard, the image scanner and the control unit are housed inside a frame 150 that constitutes a part of the body device 110. The image forming unit is provided in the frame 150 as a process cartridge 142 that is attachable to and removable from the image forming apparatus. The attachment and detachment of the process cartridge 142 are performed by turning a handle lever 144.

The frame 150 of the body device 110 is mounted with a toner container 146 so that toner is replenished from a toner supply port 148. The toner contained in the toner container 146 is fed to a development unit.

On the other hand, the body device 110 is provided with paper storage cassettes 140a, 140b and 140c at a lower portion thereof. Plural pairs of delivery rollers are provided in the body device 110, and form a delivery path through which paper in the paper storage cassettes is delivered to the image forming unit located at the upper portion of the body device. In this regard, paper sheets in each paper storage cassette are taken out sheet by sheet by a paper take-out mechanism disposed at the vicinity of an end of the delivery path, and are sent out to the delivery path. Additionally, a paper tray 136 for manual paper feeding is provided at a lateral side of the body device 110, and paper is supplied also therefrom as necessary.

The paper on which an image has been formed by the image forming unit is sequentially delivered and allowed to pass between two fuser rollers that are pressed to each other and supported by a frame 152 constituting a part of the body device 110. Then the paper is discharged out of the body device 110. The body device 110 is provided with plural discharge trays 138 at a side thereof opposite to the side at which paper tray 136 is disposed, and the paper after image formation is discharged onto the trays.

In the image forming apparatus 100, the front cover 120a and 120b receive lots of stress such as stresses and impacts associated with opening and closing, vibrations during image formation, and heat generated in the image forming apparatus. The process cartridge 142 also receive lots of stress such as impacts associated with attachment and detachment, vibrations during image forming, and heat generated in the image forming apparatus. The frame 150 and the frame 152 receive lots of stress such as vibrations during image formation and heat generated in the image forming apparatus. Therefore, resin-molded articles according to the exemplary embodiment may be suitably used as the front covers 120a and 120b in the image forming apparatus 100, exterior packaging of the process cartridge 142, the frame 150 and the frame 152.

EXAMPLES

Hereinafter, the present invention will be described specifically with reference to Examples. However, the Examples should not be construed as limiting the invention.

Example 1

—Preparation of Ion Complex—

Preparation liquid A is prepared by mixing 264.5 g of sulfuric acid (first compound) and 348.1 g of octylamine (second organic compound) in 3 L of water. Preparation liquid B is prepared by adding 500 g of 30 wt % aqueous solution of polyethyleneimine P-1000, manufactured by Jonesi Chemical Co., Ltd. (second organic compound) to 7 L of water; and further adding 467.6 g of aminobenzenesulfonic acid (first organic compound) thereto. Then, the preparation liquid A is added dropwise to the preparation liquid B so that the reaction occurs. As the addition proceeds, white precipitates are formed.

Next, the precipitates are collected by leaving the slurry standing-still for a given length of time (24 hours) and discarding the supernatant liquid, that is by a so called decantation method. The collected precipitates are rinsed with distilled water, and cleaned with methanol, whereby a desired water-insoluble substance (ion complex) is obtained.

The obtained substance (ion complex) is confirmed by an IR measurement. Specifically, measurement is conducted with an FT-IR instrument (FT-IR: Fourier Transform Infrared Spectrophotometer FT-730, manufactured by Horiba, Ltd.), and the measurement results are compared with respect to the measurement results of the respective constituent unit described below. As a result, the peak derived from the bonding between sulfuric acid or a sulfonic acid group and an amino group is confirmed, which demonstrates that the intended reaction has occurred.

Spectrum derived from sulfone and sulfonamide: 1110 to 1190 $cm^{-1}$, 1300 to 1370 $cm^{-1}$ Spectrum derived from a sulfonic acid: 1040 to 1090 $cm^{-1}$, 1150 to 1270 $cm^{-1}$ Spectrum derived from an amino group: 3200 to 3500 $cm^{-1}$, 800 to 850 $cm^{-1}$ An elementary analysis of carbon, nitrogen, and sulfur of the obtained substance (ion complex) is conducted and ratio thereof is obtained. Together with the results of the IR analysis, it is confirmed that the desired substance (ion complex) is obtained.

—Preparation of Resin Composition and Resin-Molded Article—

A resin composition is prepared by adding 25 parts by weight of the ion complex prepared above to 100 parts by weight of an ABS resin (trade name: AT-05, manufactured by Nippon A & L Co., Ltd.), and melt-mixing the mixture at 180° C. using a biaxial extruder. Then, a resin-molded article (specimen for UL-94 flammability test having a width of 13 mm, a length of 125 mm, and a thickness of 2.0 mm) is prepared from the above resin composition by melt-molding at 200° C. with a press.

The prepared resin composition and the specimen for a flammability test are evaluated as follows. The results of the evaluations are shown in Table 1.

<Residual Ratio Measurement>

A thermogravimetric analysis (TGA) of the prepared resin composition is conducted as follows. Specifically, under a nitrogen gas stream, the temperature is raised from room temperature to 600° C. at an temperature increase rate of 20° C./min. using TGA-DTA 2000S, manufactured by Seiko Instruments Inc. (trade name). Then, the residual ratio at 600° C. is measured.

<Dispersibility Evaluation>

Dispersibility of the ion complex in the prepared resin composition is evaluated.

As for the evaluation method of dispersibility, a film having a thickness of 500 μm is prepared by pressing the prepared resin composition at 200° C. Then, the film is observed through a microscope.

—Dispersibility Evaluation Criteria—

G1: The result of the dispersibility evaluation shows that the ion complex is uniformly dispersed in the resin composition, which indicates excellent dispersibility.

G2: The result of the dispersibility evaluation shows that, although aggregation is not observed, the flame retardant in a particulate form is observed, which indicates slightly non-uniform dispersion state.

G3: The result of the dispersibility evaluation shows that many aggregated portions are observed and the dispersion state of the flame retardant is clearly non-uniform, which indicates unsatisfactory dispersibility.

<Bleed Evaluation>

The prepared specimen for a flammability test is left still at a temperature of 60° C. and a relative humidity of 85% for 400 hours. Then, the bleed evaluation is conducted based on the following criteria.

—Bleed Evaluation Criteria—

G1: Alteration, discoloration and the like are not observed on the resin surface.

G2: Alteration, discoloration and the like are observed with naked eyes on the resin surface.

G3: The surface of the resin is sticky and oozing out (bleeding) of the flame retardant from inside of the resin is observed with naked eyes.

<Mechanical Strength (Charpy Impact-resistance Strength) Evaluation>

Charpy impact-resistance strength of the specimen for the flammability test is conducted according to JIS K7111, which is incorporated herein by reference.

—Mechanical Strength Evaluation Criteria—

G1: the measurement result of Charpy impact-resistance strength is 7 $kJ/m^2$ or more G2: the measurement result of Charpy impact-resistance strength is 5 $kJ/m^2$ or more but less than 7 $kJ/m^2$ G3: the measurement result of Charpy impact-resistance strength is less than 5 $kJ/m^2$ <Flame Retardancy Evaluation>

UL-94 vertical flame-test is conducted using the specimen for the flammability test, and the result is classified into five ranks of HB, V-0, V-1, V-2, and Combustion, according to the evaluation criteria of UL-94 Standard. In this regard, if flame spreads in the measurement, the result is represented by "NG". The evaluation results are shown in Table 2.

<Mold Contamination Evaluation>

Injection molding is conducted by injecting the resin composition having a temperature of 250° C. from an injector having a temperature of 30° C. into a dumbbell mold. Then, the degree of adhesion of the resin composition to the portion that has not been filled with the resin is observed with naked eyes. The presence or absence of the adhered resin composition is a factor determining whether or not a short shot occurs. The term "short shot" means a phenomenon in which a molded article produced by an injection molding lacks a part of its desired shape and has an imperfect shape.

Mold Contamination Evaluation Criteria—

G1: No alteration is observed on the mold after 500 molding cycles.

G2: A discolored area is observed on the surface of the mold after 500 molding cycles.

G3: An adhered matter is observed on the mold after 100 molding cycles.

Example 2 to Example 9

Ion complexes, resin compositions, and resin-molded articles are prepared and evaluated in the same manner as in Example 1, except that the composition of the ion complex prepared in Example 1 is changed to the compositions shown in Table 1. The results of the evaluation are shown in Table 1.

Comparative Example 1 to Comparative Example 10

Comparative compounds, comparative resin compositions, and comparative resin-molded articles are prepared and evaluated in the same manner as in Example 1, except that the composition of the ion complex prepared in Example 1 is changed to the compositions shown in Table 2. The results of the evaluation are shown in Table 2.

TABLE 1

Flame-retardant resin composition or Comparative resin composition

| | Ion complex or Comparative compound | | | | | | |
|---|---|---|---|---|---|---|---|
| | Composition | Addition amount (parts by weight) | Residual ratio at 600° C. (weight %) | * | Other resin Type | * | Other flame retardant Type | * |
| Example 1 | Polyethyleneimine | 100 | 26 | 25 | ABS AT-05 | 100 | — | — |
| | Aminobenzenesulfonic acid | 312 | | | | | | |
| | Sulfuric acid | 175 | | | | | | |
| | Octylamine | 233 | | | | | | |
| Example 2 | Polyethyleneimine | 100 | 27 | 25 | ABS AT-05 | 100 | — | — |
| | Aminobenzenesulfonic acid | 312 | | | | | | |
| | Sulfuric acid | 87.5 | | | | | | |
| Example 3 | Allylamine-dimethylallylamine copolymer | 100 | 31 | 25 | ABS AT-05 | 100 | — | — |
| | Aminobenzenesulfonic acid | 312 | | | | | | |
| | Sulfuric acid | 175 | | | | | | |
| | Octylamine | 233 | | | | | | |
| Example 4 | Polyacrylamidemethyl propanesulfonic acid | 100 | 22 | 25 | ABS AT-05 | 100 | — | — |
| | Diaminobenzene | 53 | | | | | | |
| | Benzenesulfonic acid | 77 | | | | | | |
| Example 5 | Polyacrylamidemethyl propanesulfonic acid | 100 | 28 | 25 | ABS AT-05 | 100 | — | — |
| | Aminobenzenesulfonic acid | 83.56 | | | | | | |
| | Octylamine | 62.24 | | | | | | |
| Example 6 | Polyacrylamidemethyl propanesulfonic acid | 373 | 20 | 25 | ABS AT-05 | 100 | — | — |
| | Polyethyleneimine | 100 | | | | | | |
| Example 7 | Polyacrylamidemethyl propanesulfonic acid-N,N'-methylenebisacrylamide cross-linked copolymer | 100 | 24 | 25 | ABS AT-05 | 100 | — | — |
| | Polyallylamine | 28 | | | | | | |
| Example 8 | Polyethyleneimine | 100 | 26 | 25 | ABS AT-05 | 100 | Bromine-containing flame retardant PYROGUARD SR-245 (Dai-ichi Kogyo Seiyaku Co., Ltd.) | 10 |
| | Aminobenzenesulfonic acid | 312 | | | | | | |
| | Sulfuric acid | 175 | | | | | | |
| | Octylamine | 233 | | | | | | |
| Example 9 | Polyethyleneimine | 100 | 26 | 25 | ABS AT-05 | 100 | Phosphorus-containing flame retardant PX-200 (Daihachi Chemical Industry Co., Ltd.) | 10 |
| | Aminobenzenesulfonic acid | 312 | | | | | | |
| | Sulfuric acid | 175 | | | | | | |
| | Octylamine | 233 | | | | | | |

| | Evaluation | | | | |
|---|---|---|---|---|---|
| | Dispersibility | Bleed | Charpy | Flame retardancy | Mold contamination |
| Example 1 | G1 | G1 | G1 | V-2 | G1 |
| Example 2 | G1 | G1 | G1 | V-2 | G1 |
| Example 3 | G1 | G1 | G1 | V-2 | G1 |
| Example 4 | G1 | G1 | G1 | V-2 | G1 |
| Example 5 | G1 | G1 | G1 | V-2 | G1 |
| Example 6 | G1 | G1 | G1 | V-2 | G1 |
| Example 7 | G1 | G1 | G1 | V-2 | G1 |
| Example 8 | G1 | G1 | G1 | V-2 | G1 |
| Example 9 | G1 | G1 | G1 | V-2 | G1 |

* Content (parts by weight)

TABLE 2

Flame-retardant resin composition or Comparative resin composition

| | Ion complex or Comparative compound | | | | Other resin | | Other flame retardant | |
|---|---|---|---|---|---|---|---|---|
| | Composition | Addition amount (parts by weight) | Residual ratio at 600° C. (weight %) | * | Type | * | Type | * |
| Comp. Example 1 | Styrenesulfonic acid-acrylonitrile copolymer | 100 | 17 | 25 | ABS AT-05 | 100 | — | — |
| Comp. Example 2 | Poly(sodium acrylamidemethylpropane) sulfonate | Marketed product | 20 | 25 | ABS AT-05 | 100 | — | — |
| Comp. Example 3 | Sodium dodecylbenzene sulfonate | Marketed product | 18 | 25 | ABS AT-05 | 100 | — | — |
| Comp. Example 4 | Poly(potassium styrenesulfonate) | Marketed product | 26 | 25 | ABS AT-05 | 100 | — | — |
| Comp. Example 5 | Ammonium sulfate | Marketed product | 1 | 25 | ABS AT-05 | 100 | — | — |
| Comp. Example 6 | Melamine sulfate | Marketed product | 33 | 25 | ABS AT-05 | 100 | — | — |
| Comp. Example 7 | Guanidine sulfate | Marketed product | 11 | 25 | ABS AT-05 | 100 | — | — |
| Comp. Example 8 | Sulfuric acid Octylamine | 100 263.2 | 5 | 25 | ABS AT-05 | 100 | — | — |
| Comp. Example 9 | — | — | — | — | ABS AT-05 | 100 | Bromine-containing flame retardant PYROGUARD SR-245 (Dai-ichi Kogyo Seiyaku Co., Ltd.) | 25 |
| Comp. Example 10 | — | — | — | — | ABS AT-05 | 100 | Phosphorus-containing flame retardant PX-200 (Daihachi Chemical Industry Co., Ltd.) | 25 |

| | Evaluation | | | | |
|---|---|---|---|---|---|
| | Dispersibility | Bleed | Charpy | Flame retardancy | Mold contamination |
| Comp. Example 1 | G1 | G2 | G1 | NG | G3 |
| Comp. Example 2 | G2 | G2 | G2 | NG | G2 |
| Comp. Example 3 | G2 | G3 | G3 | NG | G2 |
| Comp. Example 4 | G3 | G3 | G3 | NG | G2 |
| Comp. Example 5 | G3 | G3 | G3 | HB | G3 |
| Comp. Example 6 | G2 | G1 | G3 | NG | G1 |
| Comp. Example 7 | G2 | G2 | G3 | HB | G2 |
| Comp. Example 8 | G2 | G1 | G3 | HB | G1 |
| Comp. Example 9 | G1 | G1 | G1 | V-2 | G1 |
| Comp. Example 10 | G1 | G1 | G1 | V-2 | G1 |

* Content (parts by weight)

As shown in Table 1 and Table 2, the resin compositions and resin-molded articles prepared in Example 1 to Example 9, containing an ion complex formed from compounds including at least one first compound each selected from sulfuric acid or a compound having a sulfonic acid group and at least one second organic compound having a cationic moiety wherein at least one of the first compound or the second organic compound includes a high-molecular-weight compound, exhibit superior results with respect to all of the evaluation items including dispersibility, bleed, mechanical strength, flame retardancy, combustion time, and mold contamination, compared to the comparative resin compositions and the comparative resin-molded articles prepared in Comparative Examples. That is to say, the resin compositions and resin-molded articles prepared in Example 1 to Example 9 have superior dispersibility, high mechanical strength, and excellent flame retardancy and cause less bleed and mold contamination.

Further, compared to the resin compositions and resin-molded articles shown in Example 8 and Example 9, containing a halogen compound or a phosphorus compound which is generally used as a flame retardant the resin compositions and resin-molded articles prepared in Example 1 to Example 7, not containing such a flame retardant, each exhibit superior results with respect to both of flame retardancy and mechanical strength. Accordingly, it is understood that resin compositions and resin-molded articles with high mechanical strength and excellent flame retardancy can be obtained even when a halogen compound or phosphorus compound is not contained.

Further, as shown in Comparative Example 5 to Comparative Example 8, the results indicate that the mechanical strength is decreased when all of the at least one first compound each selected from sulfuric acid or an organic compound having a sulfonic acid group and the at least one second organic compound having a cationic moiety are low-molecular-weight compounds. From the results, it is understood that a decrease in the mechanical strength of the resin compositions and resin-molded articles prepared in Example 1 to Example 9 is suppressed as the compatibility with the resin and the dispersibility in the resin are improved due to the fact that at least one of the at least one first compound or the at least one second organic compound in the ion complex includes a high-molecular-weight compound in Examples 1 to 9.

Furthermore, as shown in Example 1 to Example 7, the flame retardants according to the present application show evaluation results comparable to those of a bromine-containing flame retardant (Comparative Example 9) and a phosphorus-containing flame retardant (Comparative Example 10), which are commonly used flame retardants, with respect to all of dispersibility, bleed, Charpy, flame retardancy, and mold contamination. Therefore, the flame retardants disclosed herein can also be used as a substitute for such common flame retardants. Moreover, as shown in Example 8 to Example 9, satisfactory results are obtained even when the flame retardant disclosed herein is used in combination with a bromine-containing flame retardant or a phosphorus-containing flame retardant.

What is claimed is:

1. A flame retardant comprising an ion complex formed from compounds including at least one first compound each selected from sulfuric acid or an organic compound having a sulfonic acid group and a second organic compound each having a cationic moiety, the ionic complex including ionic bonding of sulfuric acid or a sulfonic acid group in the at least one first compound and at least one cationic moiety in the at least one second organic compound, and at least one of the at least one first compound or the at least one second organic compound being a polymer,
   wherein the at least one first compound further includes a compound that has a cationic moiety ionically binding to sulfuric acid or a sulfonic acid group in another molecule of the at least one first compound, wherein the other molecule of the at least one first compound may be the same as or different from the compound of the first compound having the cationic moiety,
   in a case in which the at least one first compound is a polymer, the at least one first compound is selected from a polymer or copolymer of acrylamidemethylpropanesulfonic acid, or a polymer or copolymer of styrenesulfonic acid; and
   in a case in which the at least one second organic compound is a polymer, the at least one second organic compound is selected from polyethyleneimine, polypropyleneimine, polyallylamine, or a copolymer thereof.

2. The flame retardant according to claim 1, wherein at least one of the at least one first compound in the ion complex is sulfuric acid.

3. The flame retardant according to claim 1, wherein the cationic moiety of the second organic compound and the cationic moiety of the first compound comprise nitrogen.

4. The flame retardant according to claim 1, wherein at least one of the at least one first compound or the at least one second organic compound includes a compound having a branch.

5. The flame retardant according to claim 1, wherein at least one of the at least one first compound has an aromatic ring.

6. The flame retardant according to claim 1, wherein the ion complex includes two or more ionic bonds between at least one of the at least one first compound and at least one of the at least one second organic compound.

7. The flame retardant according to claim 1, wherein the ion complex is insoluble in water.

8. The flame retardant according to claim 1, wherein the ion complex is neutral.

9. The flame retardant according to claim 1, wherein the ion complex has a cross-linked structure.

10. The flame retardant according to claim 9, wherein the ion complex has cross-linking in which an ionic bond between the sulfuric acid or sulfonic acid group and the cationic moiety serves as a cross-linking point.

11. A resin composition comprising the flame retardant of claim 1 and a resin.

12. A resin-molded article comprising the flame retardant of claim 1 and a resin.

* * * * *